United States Patent [19]

Bard

[11] Patent Number: 4,677,801

[45] Date of Patent: Jul. 7, 1987

[54] WALL, CEILING AND/OR FLOOR FORMATION AND A METHOD FOR PRODUCING IT

[76] Inventor: Martin Bard, Seminargasse 26, D-8450 Amberg, Fed. Rep. of Germany

[21] Appl. No.: 774,919

[22] Filed: Sep. 11, 1985

[30] Foreign Application Priority Data

Sep. 13, 1984 [DE] Fed. Rep. of Germany ....... 3433702

[51] Int. Cl.$^4$ .......................... E04B 2/02; H05B 3/36
[52] U.S. Cl. ........................................ 52/389; 52/747; 219/345; 219/213
[58] Field of Search .............. 219/345, 213, 548, 549, 219/528; 52/747, 389

[56] References Cited

U.S. PATENT DOCUMENTS

| | | | |
|---|---|---|---|
| 1,533,227 | 4/1925 | Colby | 219/345 |
| 1,703,640 | 2/1929 | Predari | 219/548 |
| 2,328,666 | 9/1943 | Musgrave | 219/345 |
| 2,504,146 | 4/1950 | Mossin | 219/345 |
| 2,543,937 | 3/1951 | Reynolds | 219/345 |
| 2,569,961 | 10/1951 | Tidd | 219/345 |
| 2,850,554 | 9/1958 | Friedman | 219/345 |
| 2,939,807 | 6/1960 | Needham | 219/345 |
| 2,961,522 | 11/1960 | Hammer | 219/345 |
| 3,060,300 | 10/1962 | Horner | 219/345 |
| 3,088,019 | 4/1963 | Crump | 219/345 |
| 3,546,432 | 12/1970 | Eisler | 219/213 |
| 3,697,728 | 10/1972 | Stirzenbecher | 219/345 |
| 3,878,362 | 4/1975 | Stinger | 219/549 |
| 4,107,512 | 8/1978 | Bradenburg, Jr. | 219/345 |
| 4,224,773 | 9/1980 | Schworer | 52/389 |
| 4,363,947 | 12/1982 | Bergersen | 219/345 |
| 4,485,297 | 11/1984 | Grise et al. | 219/345 |
| 4,564,745 | 1/1986 | Deschenes | 219/345 |
| 4,574,186 | 3/1986 | Sakai et al. | 219/549 |

FOREIGN PATENT DOCUMENTS

| | | | |
|---|---|---|---|
| 666563 | 10/1929 | France | 219/345 |
| 1154998 | 4/1958 | France | 219/345 |
| 414457 | 7/1946 | Italy | 219/345 |
| 40-252 | 12/1975 | Japan | 219/548 |
| 177896 | 6/1935 | Switzerland | 219/213 |
| 224321 | 11/1924 | United Kingdom | 219/213 |
| 331237 | 6/1930 | United Kingdom | 219/345 |

*Primary Examiner*—William F. Pate, III
*Assistant Examiner*—Michael Safavi
*Attorney, Agent, or Firm*—Price, Heneveld, Cooper, DeWitt & Litton

[57] ABSTRACT

Figure 2:
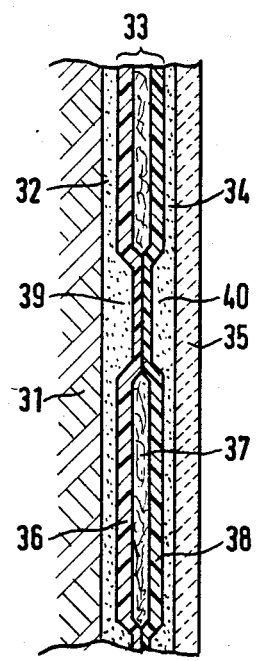

In order for a wall, ceiling and/or floor formation comprising a substratum which may or must be plastered and a surface layer and further a flat resistance heating element arranged between the surface layer and the substratum and composed of a polyester cover layer, a conductive intermediate layer provided with lead-ins and lead-outs, e.g. a graphite and/or soot resistance layer, and a polyester bottom layer, to use elements of design for the limits of rooms and as such to serve to heat the room provided with this wall, ceiling and/or floor formation, the following proposal is made: the surface layer consists of ceramic shaped bodies, in particular tiles (35) and the resistance heating element (33) is glued to the substratum using an adhesive compound (32) which adheres both to the substratum (31) and to the free polyester surface of the cover layer (36) of the resistance heating element, while the ceramic shaped bodies are glued to the free surface of the polyester bottom layer (38) using an adhesive compound (34) which adheres both to the surface of this polyester bottom layer and to the side of the ceramic shaped bodies facing away from their visible side (FIG. 2).

6 Claims, 6 Drawing Figures

WALL, CEILING AND/OR FLOOR FORMATION AND A METHOD FOR PRODUCING IT

The present invention relates to a wall, ceiling and/or floor formation comprising a substratum which may or must be plastered and a surface layer and further a resistance heating element arranged between the surface layer and the substratum and composed of a polyester cover layer, a conductive intermediate layer provided with lead-ins and lead-outs, e.g. a graphite and/or soot resistance layer, and a polyester bottom layer It is known to heat rooms using space heaters which are generally provided below window openings so that the air in the room which they heat rises above the window openings, thereby producing a curtain of warm air in front of the window opening. In the case of radiators placed against the wall there is also a movement of air from the floor to the ceiling of the room they heat, whereby the heat radiated by the radiator into the room plays only a small part.

Conventional radiators, in the strict sense, provided in rooms have a radiation range which is very limited locally and work at high temperatures.

The prior art also includes floor heating systems in which heating coils subjected to a liquid heat transfer medium, or else electrical heating conductors, are provided in the floor pavement or below the uppermost floor covering. Floor heating systems have a relatively elaborate and expensive construction, however, and require relatively complicated control.

The prior art also includes flat formations, e.g. an electrical heating film disclosed in DE-B No. 16 15 257. Other teachings involve embedding resistance layers or conductive metal foils between insulating layers or films, thereby creating flat heating elements, e.g. for a floor heating and air-conditioning system (DE-A No. 30 26 098 or DE-A No. 23 06 271).

However, none of these teachings provides a possibility of forming elements of design for the limits of the room themselves so as to enable them, whether singly, in groups or as the entire limits of the room or a substantial part thereof, to perform the task of heating the room or part of the boundary of the room to be heated or kept warm.

A pamphlet issued by the company Canespa KG, of 3005 Hemmingen-Westerfeld, Gutenbergstrasse 13, in 1957 already discloses a wireless heating system called "Canespa-Therm" in which a heating varnish layer is provided as an electrical resistance coating on the back of shaped bodies, i.e. ceramic tiles. This heating varnish layer is covered by a polyurethane foam body. This system did not gain wide acceptance, however, since there was repeatedly local overheating, leading to harmful complications which even caused danger to persons and objects.

The invention is based on the problem of proposing a wall, ceiling or floor formation using on a substratum which may or must be plastered. ceramic elements of design for the limits of rooms and which can as such serve to heat the room provided therewith.

This problem is solved according to the invention by the following features: the surface layer consists of ceramic shaped bodies, in particular tiles, and the resistance heating element is glued on using an adhesive compound which adheres both to the substratum and to the free polyester surface of the cover layer, while the ceramic shaped bodies are glued to the free surface of the polyester bottom layer using an adhesive compound which adheres both to the surface of this polyester bottom layer and to the side of the ceramic shaped bodies facing away from their visible side.

German patent application No. P 34 07 444.9 already proposes a ceramic shaped body provided on the side facing away from its visible side with an electrical resistance coating having even electrical and thermal conductivity over the entire area of the coating. It has already been considered that the electrical resistance coating should consist of an electrical resistance film which is glued at least locally, but preferably across the surface, to the side of the shaped body facing away from its visible side.

The inventive proposal differs from this in that the resistance film, being unrolled from a reel, for example, is laid out over the entire surface to be covered and the corresponding connecting elcments are joined together, the ceramic material being provided in the desired orientation to this overall covering of the floor, ceiling or wall surface.

A development of the invention consists in the cover layer and the bottom layer of the resistance film being locally welded together by ultrasonic action, thereby supplanting the resistance layer under the force of applied pressure. This measure is occasionally required when it becomes apparent that the bond between the resistance layer and the cover layer or bottom layer does not suffice for suspending ceramic tiles on walls or even ceilings, for example. In such a case the connection between the cover layer and the bottom layer at various points prevents these two layers from being detached from the resistance layer and thereby severing it, which might lead to the ceramic covering falling off.

If one wants to use conventional ceramic adhesives which are able to connect the ceramic tiles directly with the substratum which may or must be plastered, one must provide, in a further devclopment of the invention, a resistance heating element bctween the substratum and the surface layer, said element being locally perforated, e.g. punched through, the substratum and the surface made of ceramic tiles being joined together by means of an adhesive which penetrates the punched holes and adheres at least to the ceramic tiles and to the substratum. In order to prevent stray currents in the area of the holes it is advantageous, as in a further development of the invention, for the edges of the holes in the cover layer and the bottom layer to be welded together.

However, one may also insert a rivet, preferably a tubular rivet, made of electrically insulating material into each hole. When a solid rivet is used it must of course be bored subsequently.

Another possibility for insulating the walls of the holes consists in inserting into each hole a piece of tubing made of an electrically insulating material, said piece of tubing being connected, if necessary, in an appropriate manner to the cover layer and the bottom layer, at least at the edges thereof.

There is also the possibility of inserting or casting into each hole an insulating plug which, if it is a solid plug, must be bored in such a way as to create anchoring points for the adhesive layers on the substratum and the back of the tile.

It may be particularly advantageous if, in accordance with a modified embodiment of the invention, the resistance heating element has its area divided up, leaving areas not covered thereby, the constituent areas communicating with each other electrically and perforations of the resistance heating element being provided locally in the areas not covered by the resistance heating element.

The inventive method for lining a substratum such as a wall, a ceiling or a floor, with ceramic tiles expediently carried out in such a way that an adhesive is applied to the substratum which may or must be plastered, said adhesive adhering to this substratum. A resistance heating element of the stated kind, which is pretreated with a primer on the surface to be glued on, is then applied, the primer preparing the polyester surface of the resistance heating element so as to ensure adhesion to the adhesive applied to the substratum. A primer is now applied in turn to the surface which is still free on the resistance heating element and then the tile material is glued on either by means of an adhesive applied to the primer or by the tile material being appropriately pretreated with the adhesive.

A modification of this method which does not require the use of relatively complicated adhesive systems consists in using a resistance heating element which is locally perforated, e.g. punched through, so that this resistance heating element is now simply applied to a substratum surface which is provided with an adhesive which adheres both to the substratum and to the ceramic tile material. If the heating element is now laid on this substratum surface provided with such an adhesive, whereby it may have to be tacked locally, tile material appropriately provided with adhesive may then be applied, the adhesive exposed in the perforated areas joining with the adhesive on the back of the tile material, so that both the tile material and, via the adhesive penetrating the punched holes, the resistance heating element are held in place appropriately.

Figure 1:
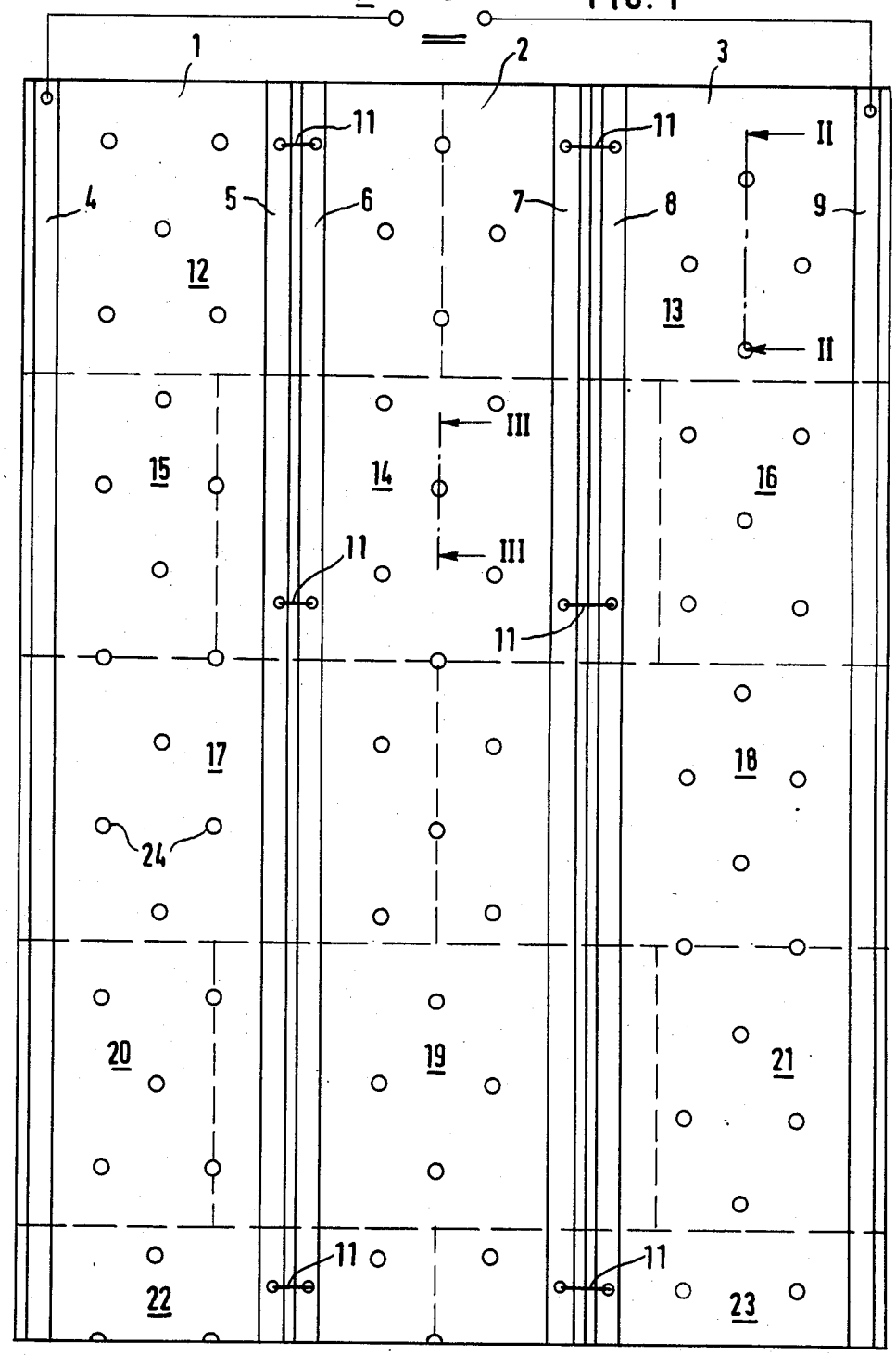

The drawing shows:

FIG. 1 a top view of a wall formation, in which applied ceramic tiles are only indicated schematically by dotted lines FIG. 2 an enlarged partial cross-section of the arrangement along line II—II of FIG. 1

Figure 3:
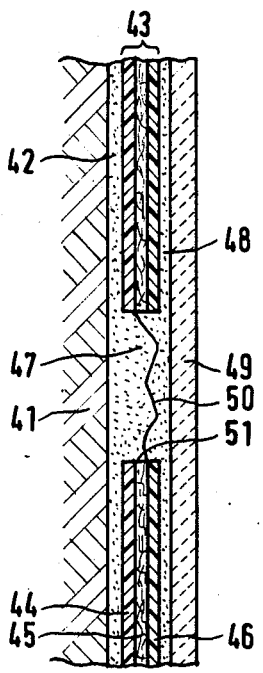
Figure 4:
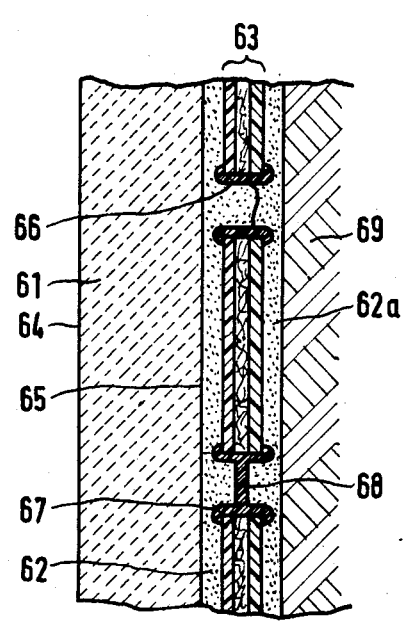
Figure 5:
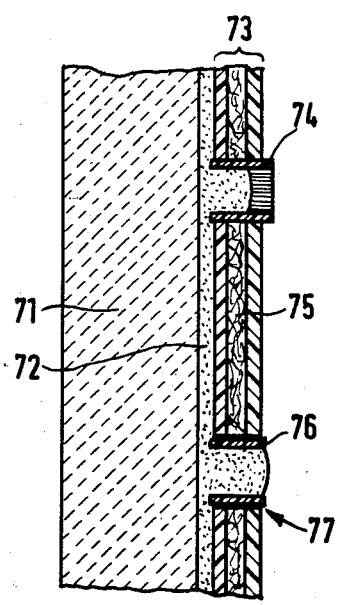
Figure 6:
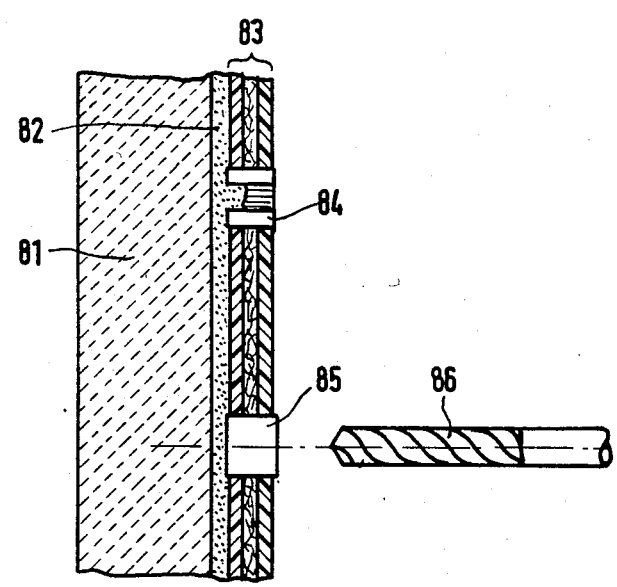

FIG. 3 an enlarged partial cross-section of the arrangement according to FIG. 1 along line III—III of FIG. 1, but with a different embodiment of the wall formation FIG. 4 a greatly enlarged partial cross-section of the tile according to FIG. 3 with further modifications of its structure FIG. 5 a greatly enlarged partial cross-section of the tile according to FIG. 3 with further modifications of its structure FIG. 6 an equally possible further modification with a method step indicated According to FIG. 1, tracks 1, 2, 3 of a resistance heating element are laid out on a base corresponding, for example, to the area of the drawing. These tracks have copper bands 4, 5, 6, 7, 8 and 9 along their edges. The two copper bands 4 and 9 are fed current from a current source indicated schematically at 10, so that the resistance heating elements heat up accordingly. The connection between elements 1 and 2, on the one hand, and 2 and 3, on the other hand, is established by connections 11.

The possible formation of the conductive intermediate layer of the resistance heating element in a design in which its area is divided up leaving areas not covered thereby, is not shown in detail. It may, for example, involve a meander-shaped arrangement of the resistance layer or a division of the latter into several flat areas in the form of bands, unit areas, etc., which are interconnected electrically or must be connected subsequently. The selection of the appropriate pattern depends on the local data and/or the technical requirements.

The structure of the individual resistance heating elements will be dealt with in more detail later in connection with the description of FIGS. 2 and 3.

Ceramic tiles 12 to 23 having relatively large areas are laid on the resistance heating elements in the embodiment. The format and peripheral design of these tiles may be selected at will.

In FIG. 2 the substratum, which may be plastered, is identified as 31. It may be a wall, a ceiling or a floor.

On this substratum there is a layer of adhesive 32 on which resistance heating element 33 is laid. This element is covered by a further layer of adhesive 34 by means of which ceramic tile 35 is attached to element 33. Element 33 consists of a polyester cover layer 36, a resistance layer 37 and a bottom layer 38. In the embodiment shown, the cover layer and the bottom layer are brought in contact with each other locally at 39 and 40, thereby supplanting resistance layer 37, and joined together, for example by ultrasonic welding. The adhesion between the surface of the polyester film and the substratum or ceramic tile must be effected by means of an adhesive capable of establishing a bond between these different surfaces. This connection is preferably effected by first applying adhesive 32 to substratum 31, then treating the free surface of cover layer 36 with a primer and after this treatment attaching resistance heating element 33 to substratum 31. The surface of the bottom layer which is still exposed is now coated with a primer and then tile 35 provided with adhesive 34 is laid on.

The adhesive is, for example, the product known by the trade name PCI-Lastoment 2. A useful primer for this is commercially available under the trade name Collastic FH.

In the embodiment indicated schematically in FIG. 3 there is no need to use a special adhesive. It suffices to use an adhesive which is capable of connecting the substratum with the ceramic tile. In FIG. 3 the substratum is identified as 41, to which an adhesive 42 of the stated type is applied. This is followed by resistance heating element 43. This element, like element 33, consists of a cover layer 44, a resistance layer 45 and a bottom layer 46. This resistance heating element 43 is punched out locally, as indicated in FIG. 1 by small circles 24. The punched hole is identified as 47 in FIG. 3. This punched hole is penetrated both by adhesive 42 and by adhesive 48 which is applied to tile 49. The place where the two layers of adhesive meet is indicated schematically by line 50. The punching is preferably carried out using a heated punch so that the edges of the cover layer and of the bottom layer are welded together at 51 and thus resistance layer 45 cannot come in contact with the adhesive in the punched hole.

In the embodiment according to FIG. 4, 61 refers to a ceramic tile having a layer of adhesive 62 applied to the side 65 facing away from its visible side 64. On this layer of adhesive 62, which need only adhere to tile 61, there is resistance heating element 63 whose structure corresponds to that of resistance heating elements 33 and 43 so that it need not be described again here in any detail. The resistance heating element is punched out in a pattern as can be seen, for example, in FIG. 1, and the resulting holes have rivets 66 or 67 made of an insulating material inserted into them. Rivet 67 has a center wall 68. Thus adhesive can penetrate in this case into the resulting blind holes both from the layer of adhesive 62 and from the layer of adhesive 62a applied to a substratum 69. This provides sufficient attachment of tile 61 to substration 69 by means of adhesive 62 and 62a bonding to opposite faces of center wall 68.

FIG. 5 shows a tile 71 with layer of adhesive 72 and resistance heating element 73 into which holes are punched. The upper punched hole is occupied by a tightly fitted piece of pipe or tubing 74 which slightly protrudes at the ends and insulates the conductive resistance layer 75. A piece of pipe or tubing 76 is inserted into the lower punched hole, and secured by glue 77. This also allows for good insulation of the resistance layer in the area of the punched hole where the adhesive penetrates the punched hole.

FIG. 6 shows part of a tile 81 with a layer of adhesive 82 and resistance heating element 83. The upper punched hole is occupied by a fitted hollow plug 84 with fairly thick walls which may have resulted from a solid plug 85 (see the lower punched hole) being bored after insertion into the punched hole. The boring need not necessarily take place until after the film is glued to the tile. This act of boring is indicated symbolically by drill 86.

I claim:

1. Means for heating a room having at least one surface forming a rigid substratum, a flat blanket-like heating element having inner and outer jackets of polyester and an electrical resistance member sandwiched between said jackets, means for connecting said resistance member to a source of electrical energy, at spaced intervals said resistance member having voids, a first layer of adhesive for bonding said inner jacket to said substratum; a layer of ceramic tiles forming the exterior surface of said means, a second layer of adhesive between said tiles and an outer jacket of said heating element and bonded to both said outer jacket and the inner face of said tiles, at each of said voids in said resistance member a conection being formed between said first and second layers of adhesive capable transmitting from the tile to the substratum all of stress required to support said tile.

2. The means for heating a room described in claim 1 wherein at each of said voids said inner and outer jackets are ultrasonically bonded together to form said connections.

3. The means for heating a room described in claim 1 wherein said first and second layers of adhesive extend through said voids and are joined to each other to form, as the connection, a member resistant to loads tending to separate said inner and outer jackets; means electrically insulating the adhesive in said voids from said electrical resistance member.

4. The means for heating a room described in claim 3 wherein said insulating means is a collar of molded dielectric material extending through said heating element, said collar being filled with a material forming said load resistant member.

5. The means for heating a room described in claim 4 wherein said collar intermediate its ends has a web to which said adhesive bonds.

6. A method of preparing a surface of a room for effecting radiant heating, providing a rigid substratum, providing a blanket-like electrical heating element having inner and outer polyester layers enclosing an electrical resistance member, priming one of said heating element surfaces, applying a coat of adhesive to the substratum and pressing the primed surface of said heating element against said adhesive to cause the primed surface to become bonded to said substratum and providing a plurality of spaced discrete resistance member free areas formed by voids within the resistance member itself, each occupied by material characterized by high resistance to loads tending to separate said inner and outer polyester layers, priming a second surface of the heating element and adhesively securing thereto a plurality of ceramic tiles to form an exterior surface and supporting said tiles entirely by the material in said resistance member free areas.

* * * * *

UNITED STATES PATENT AND TRADEMARK OFFICE
CERTIFICATE OF CORRECTION

PATENT NO. : 4,677,801

DATED : July 7, 1987

INVENTOR(S) : Martin Bard

It is certified that error appears in the above-identified patent and that said Letters Patent is hereby corrected as shown below:

Column 1, line 59:
 "plastered." should be --plastered,--
Column 3, lines 5 and 6:
 After "tiles" insert --is--
Column 5, line 5:
 "substration" should be --substratum--
Column 5, line 35:
 Delete "the" and replace with --an--
  line 36:
 After "said" insert --heating--
  line 38:
 Delete "the" and replace with --an--
Column 6, line 2:
 Delete "of"

Signed and Sealed this

Twenty-ninth Day of March, 1988

Attest:

DONALD J. QUIGG

Attesting Officer

Commissioner of Patents and Trademarks